April 19, 1932.　　　H. LOWENFELD　　　1,854,800
SHEATH FOR MORE OR LESS PLASTIC STICKS
Filed June 4, 1929　　2 Sheets-Sheet 1
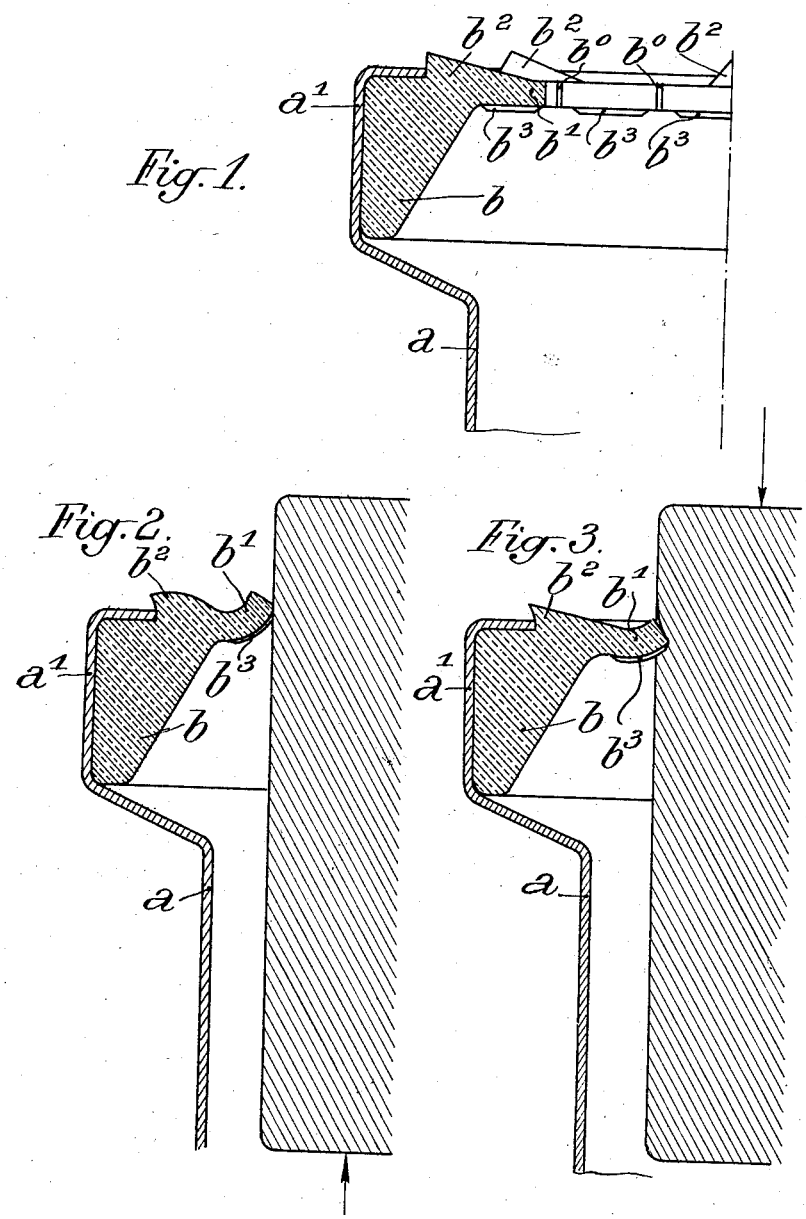
Inventor:
Henry Lowenfeld
By Louis Barnett
Attorney April 19, 1932.　　　　H. LOWENFELD　　　　1,854,800
SHEATH FOR MORE OR LESS PLASTIC STICKS
Filed June 4, 1929　　2 Sheets-Sheet 2

Inventor:
Henry Lowenfeld
By
Louis Barnett.
Attorney.

Patented Apr. 19, 1932

1,854,800

UNITED STATES PATENT OFFICE

HENRY LOWENFELD, OF PARIS, FRANCE

SHEATH FOR MORE OR LESS PLASTIC STICKS

Application filed June 4, 1929, Serial No. 368,412, and in Germany June 4, 1928.

This invention relates to improvements in cases or sheaths for more or less plastic sticks such as sticks of shaving soap, sticks of cosmetic or the like.

In such a sheath the stick of soap or the like is slidable in order that it may be extended out of the mouth of the sheath when required.

The object of the present invention is to provide improved means whereby the stick of soap or the like is retained at any degree of extension from the sheath.

For this purpose it has been proposed to fix inside the sheath a rubber ring adapted to form an annular resilient cushion which gripped the stick of soap or the like and hold it by friction in the adjusted position. Such device is only applicable to sticks of the same diameter and its efficiency is not good.

According to the present invention a rubber, vulcanized rubber or other ring, the effective or grippings portion of which has in cross section the shape of a wedge is arranged within the sheath, such ring being capable of gripping and holding sticks of shaving soap or the like which may be of different diameters within certain limits, the grip obtained being of great efficiency.

In the annexed drawings Fig. 1 shows on an enlarged scale a partial cross section of the improved sheath.

Figs. 2 and 3 are partial cross-sections, also on an enlarged scale showing respectively the conformation of the rubber or like ring when the shaving stick is being drawn out of the sheath and when it is held therein.

Figure 5:
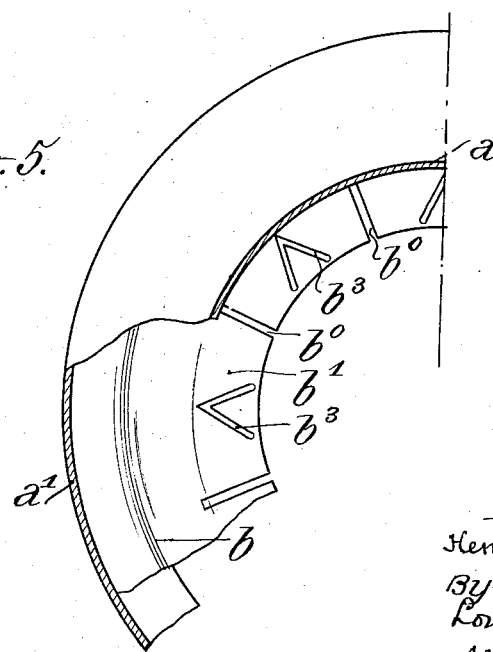

Fig. 5 a view of the underside of Fig. 1.

The tubular member or sheath $a$ is provided at its upper end with an enlargement $a^1$ forming a circular recess suitable for housing a ring $b$ of an elastic material such as rubber or vulcanized rubber moulded in such a way that it has in section the shape shown in Figs. 1 to 3 and has on the upper surface of the active part $b^1$ radial ribs $b^2$ and on the lower surface thereof small angular ribs $b^3$.

Figure 4:
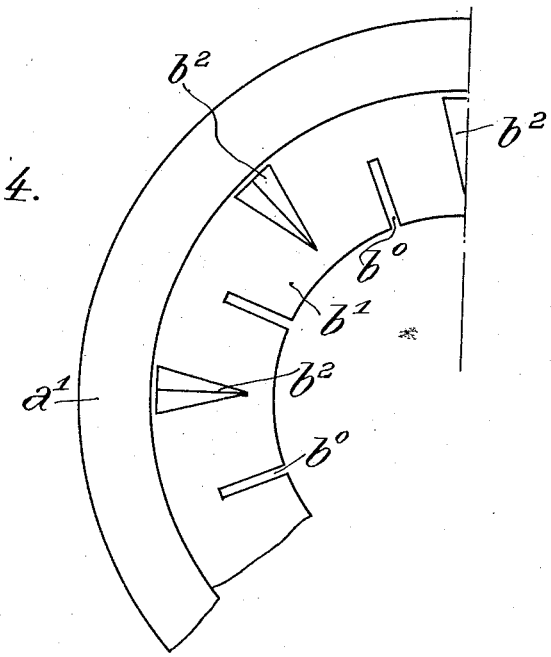
Fig. 4 is a plan view of Fig. 1.

Further as shown in Figs. 4 and 5 small radial slits $b^0$ may be formed in the active part $b^1$ to lessen the resistance of the latter when the stick is pulled out of the sheath.

Owing to the particular construction of the ring $b$ it will effectively grip the stick of soap or the like and moreover will act equally well on sticks having diameters differing by as much as some millimeters. The gripping action of the ring can be understood from Figs. 2 and 3 the effective internal part $b^1$ of the ring having a wedge-like action and, as illustrated in Figures 2 and 3, tending to flex upwardly when the stick is pulled upwardly, the part $b^1$ also serving to wedge into the stick when it is pushed slightly downwardly.

What I claim is:

A sheath for plastic sticks of the character described, comprising a housing having an enlarged opening portion, a ring fitted in said portion, said ring formed with an elastic inwardly extended edge bendable outwardly with respect to said portion adapted to automatically engage plastic sticks of various sizes on insertion into said housing, said ring having spaced slitted portions and radially extending ribs on each of said slitted portions.

HENRY LOWENFELD.